United States Patent [19]
Okano

[11] Patent Number: 5,671,028
[45] Date of Patent: Sep. 23, 1997

[54] LIQUID CRYSTAL DISPLAY INCLUDING A CONTROL MEMBER FOR PROVIDING A TRANSPARENT VISUAL RANGE WITHIN A PREDETERMINED VIEWING ANGLE AND AN OPAQUE VISUAL RANGE OUTSIDE THE PREDETERMINED VIEWING ANGLE

[75] Inventor: Masanobu Okano, Nara, Japan

[73] Assignee: Sharp Kabushiki Kaisha, Osaka, Japan

[21] Appl. No.: 435,137

[22] Filed: May 5, 1995

[30] Foreign Application Priority Data

May 11, 1994 [JP] Japan .................................. 6-097411

[51] Int. Cl.$^6$ .................................................. G02F 1/1335
[52] U.S. Cl. .................................................. 349/66; 349/57
[58] Field of Search .................................. 359/40, 42, 48, 359/49; 362/31, 35; 349/57, 62, 65, 66

[56] References Cited

U.S. PATENT DOCUMENTS 5,600,456   2/1997   Maruyama et al. ...................... 349/64

FOREIGN PATENT DOCUMENTS 2257188   10/1990   Japan .
547923    6/1993    Japan .

OTHER PUBLICATIONS

*New Backliting Technologies for Liquid Crystal Display (IV)*, ITEJ Technical Report, vol. 17, No. 48, Aug. 27, 1993—pp. 33–38.

Goldberg, David E.; Genetic Algorithms in Search, Optimization, and Machine Learning, (Jan. 1989) pp. 1–54.

"IEEE Standard Test Access Port and Boundary–Scan Architecture", Circuits and Devices Communications Technology, IEEE Std 11.49.1 1990 (includes IEEE Std 1149.1A–1993), Oct. 21, 1993.

*Primary Examiner*—William L. Sikes
*Assistant Examiner*—James A. Dudek

[57] ABSTRACT

In an lighting device, light rays, which have been illuminated from a discharge tube onto a light-guiding body and have been released from a light-emitting surface of the light-guiding body, are converged toward the normal direction by prisms each of which has a triangle- column shape and is installed on a light-converging control plate. A visual-range control plate provides a transparent visual range with a predetermined viewing angle with respect to the normal direction, while providing an opaque visual range outside the predetermined viewing angle with respect to the normal direction. This arrangement makes it possible to improve the surface luminance of the lighting device and prevent the degradation of the display quality. Thus, it is possible to achieve high-luminance, high quality lighting devices.

13 Claims, 4 Drawing Sheets

LIQUID CRYSTAL DISPLAY INCLUDING A CONTROL MEMBER FOR PROVIDING A TRANSPARENT VISUAL RANGE WITHIN A PREDETERMINED VIEWING ANGLE AND AN OPAQUE VISUAL RANGE OUTSIDE THE PREDETERMINED VIEWING ANGLE

FIELD OF THE INVENTION

The present invention relates to a lighting device for illuminating, for example, a liquid crystal display section from behind, and concerns a liquid crystal display using such a device as a backlight.

BACKGROUND OF THE INVENTION

For example, as shown in FIG. 7, in general, a plane-shaped lighting device using the edge-light system is provided with a thin tube-shaped discharge tube 51 functioning as a line-light source, a discharge-tube reflection member 52 that is disposed over the discharge tube 51 so as to effectively reflect light rays released from the discharge tube 51, and a light-guiding body 53 for converting line-light rays into plane-light rays.

The light-guiding body 53 has a transparent resin plate 54 having a superior light-transmitting property that is made of, for example, acrylic resin. On the undersurface of the transparent resin plate 54, is formed an irregular reflection plate 55 having minute dot-shaped irregular reflection portions 55a that are formed therein by using the screen printing method or other methods. Further, a reflection plate 56, made of white polyester film, is laid over the irregular reflection plate 55. Thus, a reflection surface of the surface light source is formed in the transparent resin plate 54.

On the surface of the transparent resin plate 54, is laid a light-diffusing resin sheet 57 for uniformly diffusing upwardly light rays that have been reflected from the reflection plate 56 and transmitted through the transparent resin plate 54. Thus, the light-guiding body 53, which converges line-light rays from the discharge tube 51 into plane-light rays, is formed.

Moreover, on the surface side of the light-guiding body 53, that is, on the surface of the light-diffusing resin sheet 57, is laid a light-converging control plate 58 that covers an area virtually as large as the light-guiding body 53 and that is used for improving the luminance in the normal direction of the light-guiding body 53.

As one example of the light-converging control plate 58, is listed a regulating plate, made of a transparent plate having a serrate shape in its cross section, that is installed in "a lighting device" disclosed in Japanese Laid-Open Patent Publication No. 257188/1990 (Tokukaihei 2-257188).

As shown in FIG. 7, the light-converging control plate 58 has a construction wherein a plurality of prisms, each having a triangle-column shape with its apex aligned in the normal direction to the surface of the light-converging control plate 58 (hereinafter, referred to as triangle prism), are installed on the surface thereof. In this construction, it is possible to improve surface luminance remarkably in the normal direction to the surface of the light-guiding body 53 by utilizing the optical refracting characteristics of the triangle prisms.

However, as shown in FIG. 7, the apexes of the triangle prisms of the light-converging control plate 58 are aligned outwardly from the light-emitting surface of the light-guiding body 53; this tends to cause damages to the light-converging control plate 58 when the lighting device is handled. This results in a lowering in the light-converging performance of the light-converging control plate 58 as well as a lowering in the luminance thereof. Further, since care should be taken in handling the lighting device, excessive time is required in carrying or transporting the lighting devices or in other occasions; this causes a problem of reduced productivity of the lighting device.

Moreover, the surface of the light-converging control plate 58 comes into a state like a mirror surface due to reflection caused by the edge lines of the triangle prisms; therefore, irregularities and stains in the light-converging control plate 58 itself, scratches on the triangle prisms and other defects become more visible, thereby diminishing the display quality of the lighting device when it is viewed from outside the permissible viewing angle.

In order to solve this problem, Japanese Laid-Open Utility Model Publication No. 47923/1993 (Jitsukaihei 5-47923) has disclosed "a surface light source device" wherein a light-diffusing resin sheet 59, covering an area virtually as large as the light-converging control plate 58, is laid over the surface of the light-converging control plate 58 as shown in FIG. 8. In the surface light source device, the light-diffusing resin sheet 59 protects the light-converging control plate 58, thereby preventing the light-converging control plate 58 from damages, stains and other defects. Furthermore, the light-diffusing resin sheet 59 diffuses light rays directed from the light-converging control plate 58. This prevents irregularities and stains in the light-converging control plate 58 itself, scratches on the triangle prisms and other defects from becoming visible, thereby improving the display quality of the lighting device when it is viewed from outside the viewing angle.

However, when the light-diffusing resin sheet 59 is laid over the surface of the light-converging control plate 58, the plane-light rays, which are directed from the light-guiding body 53 and converged by the light-converging control plate 58, are again diffused by the light-diffusing resin sheet 59; this causes a problem of reduced surface luminance.

SUMMARY OF THE INVENTION

It is an objective of the present invention to provide a lighting device which has improved display quality even when viewed from outside the viewing angle without causing a reduction in the surface luminance. It is another objective of the present invention to provide thin, low-power-consumption, high-luminance, high-quality liquid crystal displays by utilizing such a lighting device.

In order to achieve the above-mentioned objectives, the lighting device of the present invention is provided with: a plate-shaped light-guiding body having a light-transmitting property; a line-shaped light source that is installed on at least one edge face of the light-guiding body; a light-converging plate for transmitting light illuminated from a light-emitting surface of the light-guiding body while converging the light rays in the normal direction to the surface of the light-guiding body, the light-converging plate being installed on the light-emitting surface side of the light-guiding body as well as being provided with a plurality of prisms on its surface; and a visual-range control member for providing a transparent visual range with a predetermined viewing angle with respect to the normal direction to the surface of the light-guiding body as well as for providing an opaque visual range outside the predetermined viewing angle with respect to the normal direction.

With this arrangement, the light-converging plate converges light rays illuminated from the light-emitting surface of the light-guiding body in the normal direction; therefore, it becomes possible to improve the surface luminance in the normal direction. Further, the visual-range control member provides a transparent visual range with a predetermined viewing angle with respect to the normal direction, as well as providing an opaque visual range outside the predetermined viewing angle with respect to the normal direction; this makes it possible to realize a lighting device with superior directivity. Therefore, when this lighting device is applied to a backlight in a liquid crystal display panel, the brightness of the liquid crystal display panel is improved when viewed from the frontal direction, and it becomes possible to prevent stains, scratches and other defects on the liquid crystal display panel from becoming visible, even when viewed from outside the viewing angle, thereby preventing a reduction in the display quality.

Moreover, when this lighting device is applied to a backlight in a liquid crystal display panel, it is possible to illuminate the liquid crystal display panel uniformly and brightly. This makes it possible to achieve a liquid crystal display with high luminance and high display quality.

In addition, with an arrangement wherein the visual-range control member is made of a thin-film resin sheet that covers virtually the same area as the light-converging plate, it becomes possible to improve the surface luminance as well as to prevent a reduction in the display quality, without increasing the thickness of the lighting device. When this lighting device is applied to a backlight in a liquid crystal display panel, it becomes possible to achieve thin, high-luminance, high-quality liquid crystal displays.

For a fuller understanding of the nature and advantages of the invention, reference should be made to the ensuing detailed description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Referring to FIGS. 1 through 6, the following description will discuss one embodiment of the present invention.

Figure 2:
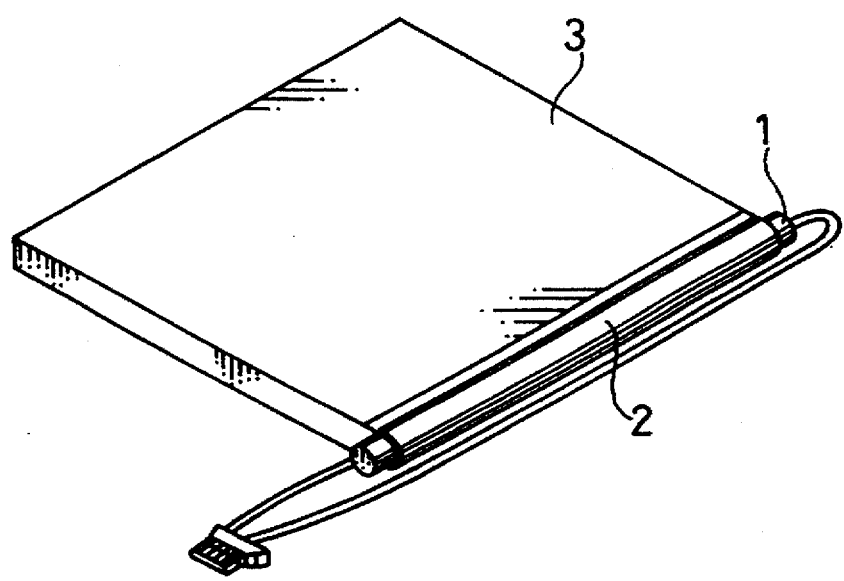
FIG. 2 is a perspective view of the lighting device.

As shown in FIG. 2, the lighting device of the present embodiment is a plane-shaped lighting device wherein the edge-light system is adopted, and is provided with a discharge tube 1 that is a line-light source, a reflection member 2 that is disposed over the discharge tube 1 so as to effectively reflect light rays released from the discharge tube 1, and a light-guiding body 3 for converging line-light rays, which have been released from the discharge tube 1 and reflected from the reflection member 2, into plane-light rays as well as for releasing the plane-light rays.

Figure 1:
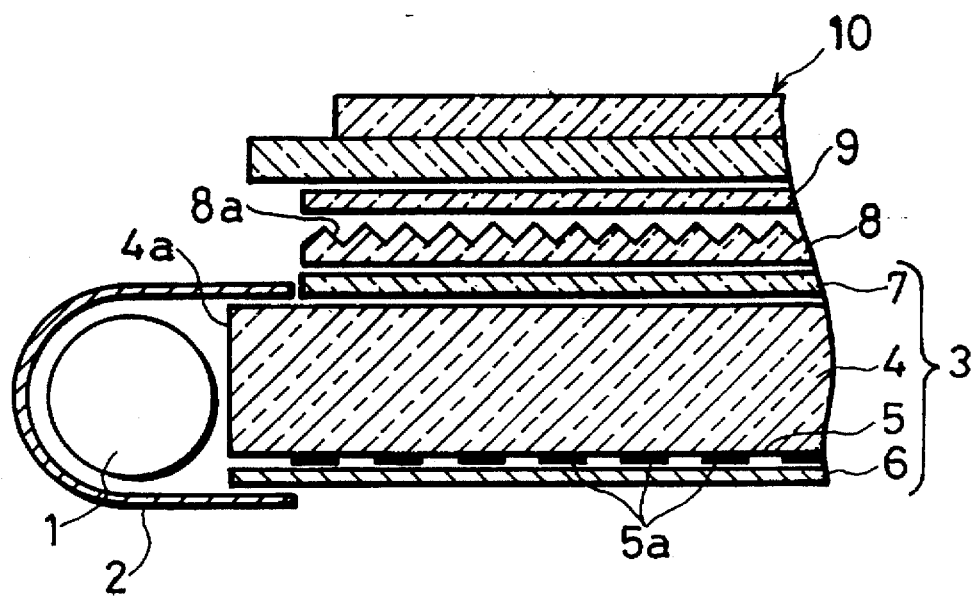
FIG. 1 is a cross-sectional view of a lighting device of one embodiment of the present invention.

Such a lighting device is installed on the undersurface side of a liquid crystal display panel 10, for example, as shown in FIG. 1, and is used as a back light of the liquid crystal display that illuminates light rays from behind the liquid crystal display panel.

As shown in FIG. 1, in the lighting device, the light-guiding body 3 is provided with a transparent resin plate 4 having a superior light-transmitting property, for example, made of acrylic resin or other materials. The transparent resin plate 4 is disposed with its one edge face 4a located close to the discharge tube 1. On the undersurface of the transparent resin plate 4, is formed an irregular reflection plate 5 having minute dot-shaped irregular reflection portions 5a that are formed therein by using the screen printing method or other methods. Further, a reflection plate 6, made of white polyester film or other members, is laid over the irregular reflection plate 5. Thus, the irregular reflection plate 5 and the reflection plate 6 constitute a reflection member in the surface-light source.

On the surface of the transparent resin plate 4, is laid a light-diffusing resin sheet 7 for uniformly diffusing upwardly light rays that have been reflected from the reflection plate 6 and transmitted through the transparent resin plate 4. Thus, the light-guiding body 3, which converges line-light rays into plane-light rays, is constituted of the transparent resin plate 4, the irregular reflection plate 5, the reflection plate 6, the light-diffusing resin sheet 7, and other members.

Figure 3:
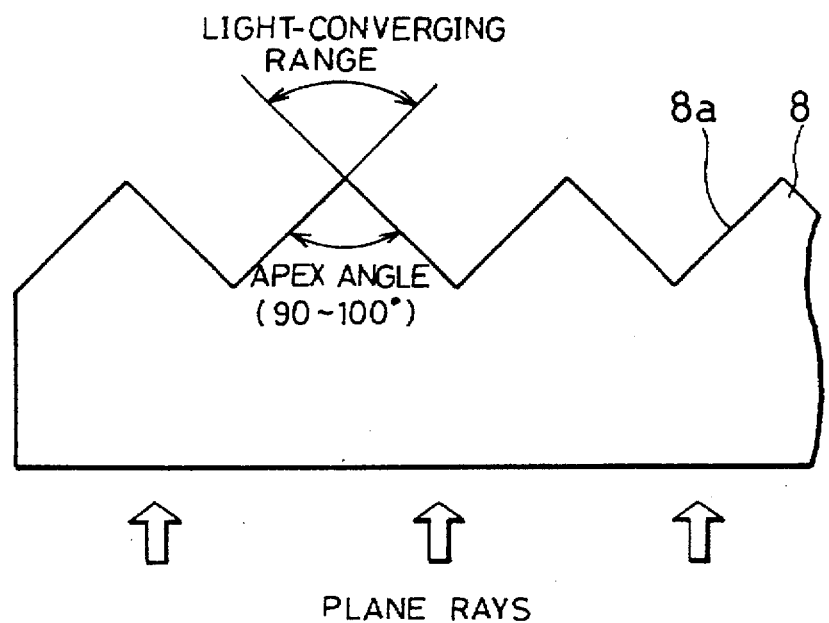
FIG. 3 is a cross-sectional view of a light-converging control plate that is installed in the lighting device of FIG. 1.

Moreover, on the surface of the light-diffusing resin sheet 7, is laid a light-converging control plate 8 made of a transparent resin sheet that covers virtually the same area as the light-guiding body 3. As shown in FIG. 3, the light-converging control plate 8 has a surface 8a whereon a number of prisms, each having a triangle-column shape with an apex angle of 90° to 100° (hereinafter, referred to as triangle prism), are formed. Each triangle prism is arranged so that its apex is aligned in the normal direction with respect to the light-converging surface of the light-converging control plate 8. Therefore, the light-converging range of the plane-light rays that are illuminated from behind has virtually the same angle (90° to 100°) as the apex angle of the triangle prism. This makes it possible to converge and illuminate light rays released from the light-diffusing resin sheet 7, thereby improving the luminance in the normal direction of the light-guiding body 3.

Figure 4:
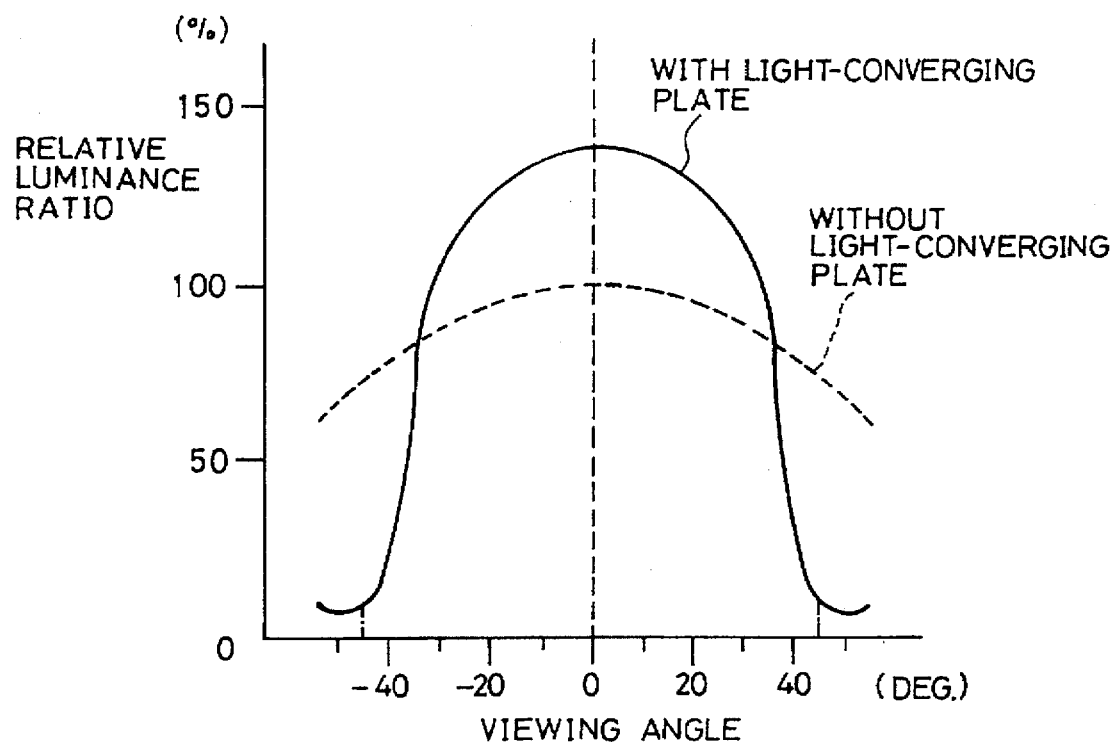
FIG. 4 is a graph that shows one example of the luminance characteristic of the light-converging control plate.

Here, FIG. 4 shows the comparison of luminance characteristics between the lighting device in which the light-converging control plate 8 is laid and a lighting device without the light-converging control plate 8.

As shown in FIG. 4, supposing that the luminance in the proximity of the viewing angle 0° is 100% in the case when no light-converging control plate 8 is provided, the relative luminance ratio in the proximity of the viewing angle 0° becomes 140% in the case when the light-converging control plate 8 is provided. In this case, if the viewing angle is greater than 45°, or if the viewing angle is smaller than −45°, the relative luminance ratio becomes 10%. Further, in the case when no light-converging control plate 8 is provided, as the absolute value of the viewing angle becomes greater than 0°, the relative luminance ratio becomes smaller. This shows that in the lighting device in which the light-converging control plate 8 is provided, it becomes possible to increase the luminance in the normal direction (viewing angle 0°) virtually by 40%, compared to the lighting device without the light-converging control plate 8.

Figure 5:
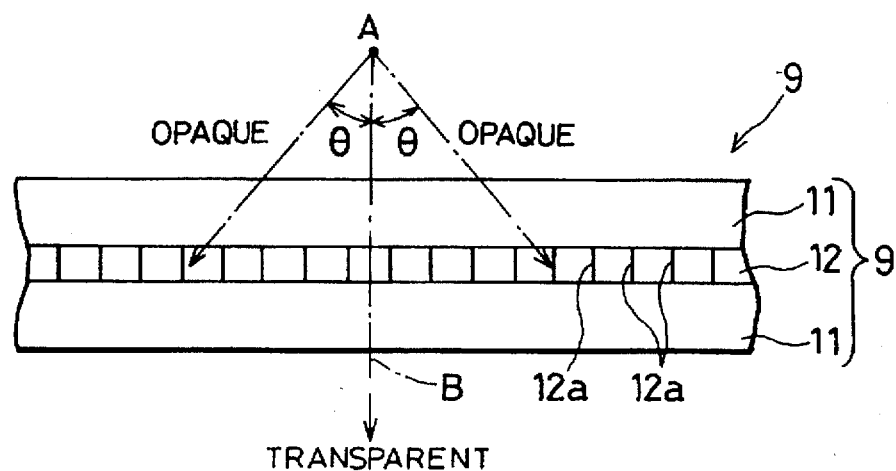
FIG. 5 is a schematic cross-sectional view showing a visual-range control plate that is installed in the lighting device of FIG. 1.

Moreover, as shown in FIG. 1, on the light-converging surface side, that is, on the surface side, is laid a visual-range control plate (visual-range control member) 9 which covers virtually the same area as the light-converging control plate 8 with a thickness of virtually 1 mm and which is made of a flexible resin sheet similar to the light-diffusing resin sheet 7 and the light-converging control plate 8. As shown in FIG. 5, the visual-range control plate 9 has a structure wherein a blind resin sheet 12 is sandwiched between two transparent PET (polyethylene terephthalate) sheets 11.

Inside the blind resin sheet 12, are placed a plurality of light-shading plates 12a that are made of resin having a light-shading property and that are arranged in parallel with one another in an orthogonal fashion to the surface thereof. The light-shading plates 12a control the transmitted light rays in such a manner that if the viewing angle θ from point A on the normal line B is located virtually within −45° to 45°, the haze rate of the visual-range control plate 9 is not more than 10% and that if the viewing angle 8 is smaller than −45°, or is larger than 45°, the haze rate of the visual-range control plate 9 is not less than 70%.

Here, the haze rate is an index that indicates the ratio of transmittance of diffused light rays with respect to all the transmitted light rays including parallel light rays and the diffused light rays that have transmitted through an object. In other words, the haze rate is represented as follows:

haze rate (%)=transmittance of diffused light rays/ transmittance of all transmitted light rays ×100. Therefore, the smaller the haze rate, the greater the transparency of an object.

As described above, the visual-range control panel 9 is arranged so that the haze rate is maintained small within a range from 0° to a predetermined angle in the viewing angle θ from point A on the normal line B; therefore, the visual range becomes transparent with respect to the light-converging surface of the light-converging control plate 8 within this range. When the viewing angle θ is not less than the predetermined angle, the haze rate becomes greater; therefore, the visual range becomes opaque with respect to the light-converging surface of the light-converging control plate 8. This arrangement makes it possible for the visual-range control plate 9 to control the visual range with respect to the light-converging surface of the light-converging control plate 8.

Additionally, although the thickness of the visual-range control plate 9 is set to virtually 1 mm, it may be designed to be thinner than this value. By making the visual-range control plate 9 as thin as possible, the lighting device is made thinner, thereby allowing the liquid crystal display using such a lighting device to be thinner.

Figure 6:
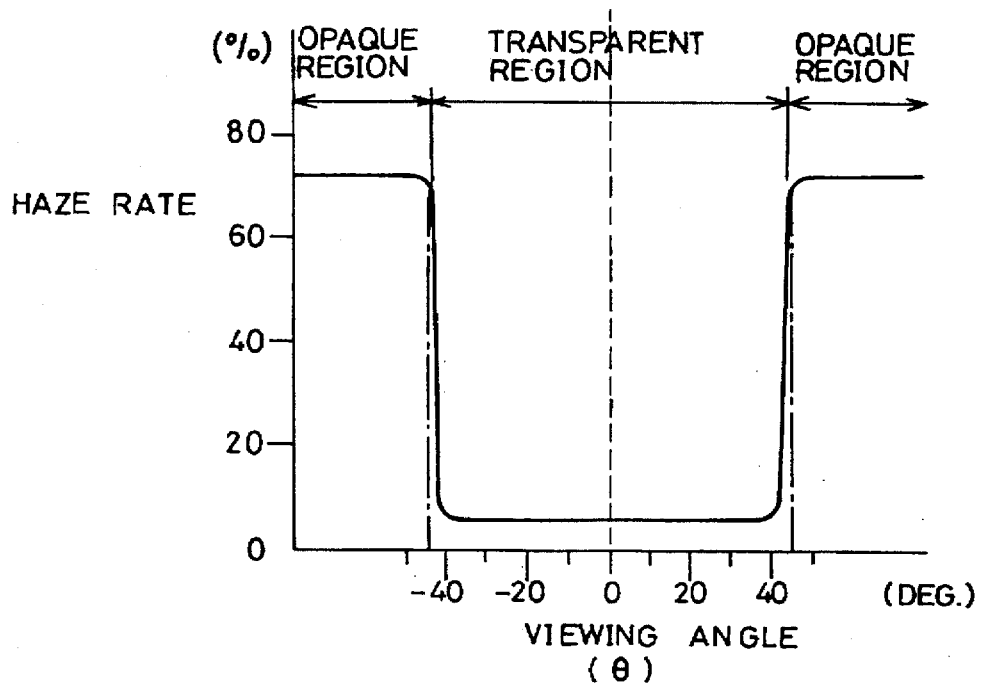
FIG. 6 is a graph that shows one example of the light-transmitting characteristic of the visual-range control plate.
Figure 7:
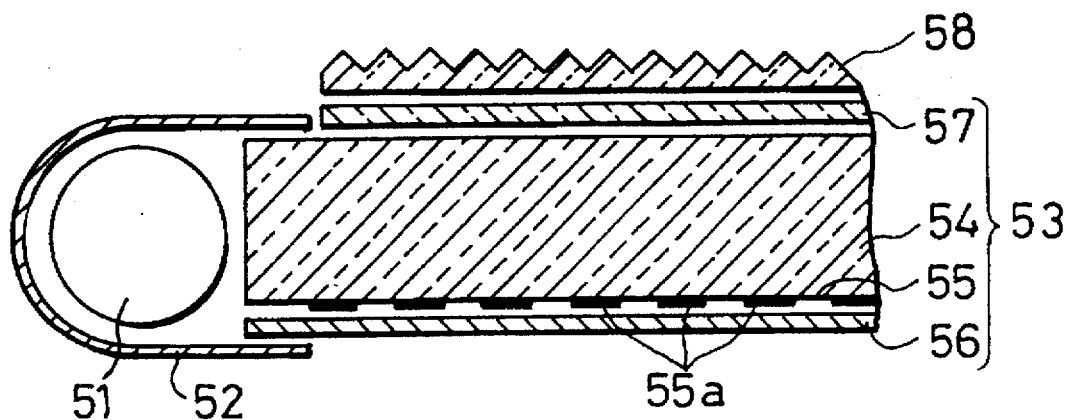
FIG. 7 is a cross-sectional view showing a conventional lighting device.
Figure 8:
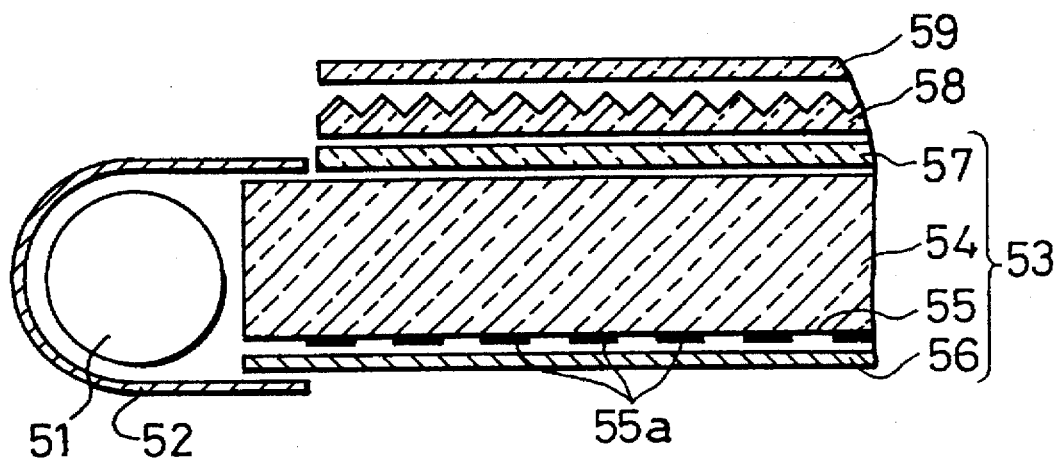
FIG. 8 is a cross-sectional view showing a conventional lighting device.

Here, FIG. 6 shows the light-transmitting characteristic of the visual-range control plate 9 having the above-mentioned arrangement. In this graph, the horizontal axis represents the viewing angle (θ) from point A on the normal line B of the visual-range control plate 9 shown in FIG. 5.

As clearly shown by FIG. 6, the visual-range control plate 9 is arranged so that if the angle θ is located virtually within −45° to 45°, it provides a transparent region having a haze rate of not more than 10%, and so that if the viewing angle θ is smaller than −45°, or is larger than 45°, it provides an opaque region having a haze rate of not less than 70%. In other words, the visual-range control plate 9 has light-transmitting characteristics such that it exhibits a transparent property in the frontal direction and an opaque property in the diagonal direction. Thus, the visual-range control plate 9 provides a control function so that the visual range becomes transparent when seen mainly in the normal direction with respect to the light-emitting surface of the light-guiding body 3, and it becomes opaque when seen in the diagonal direction with respect to the normal line.

Moreover, the viewing-angle range, which allows the visual range to become transparent with respect to the visual-range control plate 9, covers an angle range from −45° to 45° with respect to the normal of the visual-range control plate 9, as described earlier, and the size of the angle range (90°) is set to be virtually similar to, or smaller than the apex angle of each triangle prism installed on the light-converging control plate 8. With this arrangement, the visual-range control plate 9 is capable of effectively releasing light rays converged by the triangle prisms of the light-converging control plate 8 as well as preventing stains, scratches and other defects from becoming visible, even when viewed from outside the viewing angle. Consequently, it is possible to improve the surface luminance of the lighting device as well as preventing the degradation of the display quality.

As described above, light rays, released from the discharge tube 1, are reflected by the inner surface of the reflection member 2 and directed to the light-guiding body 3, or are directly led to the light-guiding body 3 through the edge face 4a of the transparent resin plate 4. The light rays, which have directed to the transparent resin plate 4, are reflected and diffused by the irregular reflection plate 5 and the reflection plate 6 to become plane-light rays, and they are formed into uniform diffused light rays through the light-diffusing resin sheet 7. The diffused light rays are converged by the light-converging control plate 8 laid on the light-diffusing resin sheet 7 into light rays that are aligned in the normal direction, and are illuminated on the liquid crystal display panel 10 through the visual-range control plate 9.

In this case, the visual-range control plate 9 allows the light rays converged by the triangle prisms in the light-converging control plate 8 to be illuminated on the liquid crystal display panel 10 through the visual-range control plate 9 without virtually any loss of light. Further, the visual-range control plate 9 is opaque when viewed from outside the so-called viewing angle, that is, when viewed in directions diagonal to the normal direction; therefore, it is possible to prevent irregularities, stains, scratches and other defects of the light-converging control plate 8 itself from becoming visible, even when viewed from outside the viewing angle, and also to improve the display quality of the lighting device.

Moreover, since the light-converging control plate 8 is protected by the visual-range control plate 9, it is free from stains and scratches. Thus, it is possible to prevent the degradation of the luminance due to scratches and stains in the light-converging control plate 8 and to improve the display quality of the lighting device. Therefore, it becomes possible to prevent scratches and stains that tend to be caused in carrying or transporting the lighting device or in other occasions, thereby making it easier to handle the lighting device as well as improving the productivity of the lighting device.

Consequently, the above-mentioned lighting device improves the display quality in the lighting device without causing a lowering in the surface luminance. Therefore, when the lighting device is adopted as a backlight, it becomes possible to provide low-power-consumption, high-luminance, high-quality liquid crystal displays.

Furthermore, since the visual-range control plate 9 of the lighting device having the above-mentioned arrangement has a visual range that is wider than the viewing-angle range of the liquid crystal display panel 10, it is possible to provide a conformity between the light-converging range and visual-range controlling range of the lighting device and the viewing-angle range of the liquid crystal display panel 10. Thus, it becomes possible to effectively illuminate light rays from the light source onto the liquid crystal display panel 10 as well as to provide a liquid crystal display with superior display quality.

Additionally, in the present embodiment, the visual-range control plate 9 having the blind resin sheet 12 is used as a visual-range control member so as to control the visual range; however, the visual-range control member is not limited to this arrangement. Another member, such as a film that utilizes refraction and diffusion anisotropies of light, may be adopted wherein the visual range is controlled so that light rays, which are incident in the normal direction, are transmitted, as they are, and light rays, which are incident in directions with angles greater than a predetermined angle with respect to the normal, are diffused.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display comprising:
   a liquid crystal display panel;
   a light-guiding plate on the back side of and in parallel with the liquid crystal display panel;
   a light source for allowing light rays to be incident on at least one edge face of the light-guiding plate;
   a light-converging plate for transmitting light rays released from the light-guiding plate while converging the light rays in the normal direction, the light-converging plate being positioned between the light-guiding plate and the liquid crystal display panel; and
   a visual range control member for providing a transparent visual range with a predetermined viewing angle with respect to the normal direction as well as for providing an opaque visual range outside the predetermined viewing angle with respect to the normal direction, the visual-range control member being positioned between the light-converging plate and the liquid crystal display panel.

2. The liquid crystal display as defined in claim 1, wherein the viewing angle of the transparent visual range provided by the visual-range control member is set to be wider than the viewing-angle range of the liquid crystal display panel.

3. The liquid crystal display as defined in claim 1, wherein the light-converging plate includes prisms each of which has a triangle-code shape and is installed on the surface thereof facing the liquid crystal display panel.

4. The lighting device as defined in claim 3, wherein each of the prisms installed on the light-converging plate is a triangle column whose apex has an angle of 90° to 100° and the viewing angle of the transparent visual range provided by the visual-range control member is set to be virtually equal to, or smaller than, the apex angle of each prism.

5. The liquid crystal display as defined in claim 1, wherein the visual-range control member includes a plurality of light-shading plates in parallel with one another and orthogonal to the surface thereof, the light-shading plates being arranged so that, if the viewing angle exceeds a predetermined value, the haze rate abruptly increases.

6. The lighting device as defined in claim 5, wherein the haze rate of the visual-range control member is controlled by the light-shading plates such that it is not more than 10% within the transparent visual range and is not less than 70% within the opaque visual range.

7. The liquid crystal display as defined in claim 1, wherein the visual-range control member is a film member having an optical property in which incident light rays at angles within a predetermined angle with respect to the normal direction thereof are transmitted and incident light rays at angles greater than the predetermined angle are diffused.

8. The liquid crystal display as defined in claim 1, wherein the visual-range control member is made of a film-like resin sheet that covers virtually the same area as the light-converging plate.

9. The liquid crystal display as defined in claim 8, wherein the visual-range control member is made of a blind resin sheet that is sandwiched between transparent resin sheets, the blind resin sheet being provided with a plurality of light-shading plates inside thereof in parallel with one another and orthogonal to the surface thereof.

10. The liquid crystal display and defined in claim 1, wherein the light-guiding plate includes an irregular reflection section on the surface thereof parallel to and furthest from the liquid crystal display for diffusing light rays.

11. The liquid crystal display as defined in claim 1, further including a reflection plate for reflecting light rays that are to be released from the light-guiding plate toward the inside of the light-guiding plate, the reflection plate being installed on the back side of the light-guiding plate, the light-emitting-surface side being the front side.

12. The liquid crystal display as defined in claim 1, further comprising a reflection member for reflecting light rays, initially illuminated in directions different than an incident direction from the line-shaped light source to the light-guiding plate, toward the light-guiding plate.

13. The liquid crystal display as defined in claim 1, further comprising a light-diffusing sheet for diffusing light rays, the light-diffusing sheet being placed between the light-guiding plate and the light-converging plate.

\* \* \* \* \*